United States Patent [19]  [11] Patent Number: 4,669,650
Moe  [45] Date of Patent: Jun. 2, 1987

[54] METHOD FOR JOINING TUBULAR PARTS OF METAL BY FORGE/DIFFUSION WELDING

[76] Inventor: Per H. Moe, Amtmann Bangs gate 7, N-3000 Drammen, Norway

[21] Appl. No.: 739,997
[22] PCT Filed: Oct. 12, 1984
[86] PCT No.: PCT/NO84/00042
§ 371 Date: May 31, 1985
§ 102(e) Date: May 31, 1985
[87] PCT Pub. No.: WO85/01684
PCT Pub. Date: Apr. 25, 1985

[30] Foreign Application Priority Data
Oct. 13, 1983 [NO] Norway ................................ 833729

[51] Int. Cl.⁴ ............................................. B25K 31/02
[52] U.S. Cl. ..................................... 228/219; 228/42
[58] Field of Search ......................... 228/219, 220, 42; 219/8.5

[56] References Cited
U.S. PATENT DOCUMENTS
2,805,315 9/1957 Chapman ............................ 219/8.5
3,194,466 7/1965 Davis ................................... 228/42
4,143,802 3/1979 Winterbottom ..................... 228/219
4,375,008 2/1983 Dathe ................................. 228/220
4,566,625 1/1986 Moe ................................... 228/265

FOREIGN PATENT DOCUMENTS
2522296 5/1975 Fed. Rep. of Germany ...... 228/219
3008153 10/1981 Fed. Rep. of Germany ...... 228/219

Primary Examiner—Nicholas P. Godici
Assistant Examiner—Karen Skillman
Attorney, Agent, or Firm—Darby & Darby

[57] ABSTRACT

A method for joining thin-walled tubular parts (1, 2) of metal by forge/diffusion welding comprising establishing a joint (3) between opposed bounding surfaces (4, 5), the joint having increasing height from one side (7) to the other. During heating of the parts the joint (3) is supplied with an inert or reducing flushing gas, for instance hydrogen, until the oxides are removed from the joint surfaces (4, 5). By subsequently pressing the parts together, complete forge/diffusion welding is obtained. It is also suggested to reduce the cross-section of the parts excentrically in the joint area and press the parts out to their initial cross-section during the forge/diffusion welding. A packer (8) is used to close the joint (3) on the side where the distance between the parts (1, 2) is the greatest. Means (10, 11) are shown for performing the welding under water.

11 Claims, 3 Drawing Figures

Fig.2.
Fig.3.
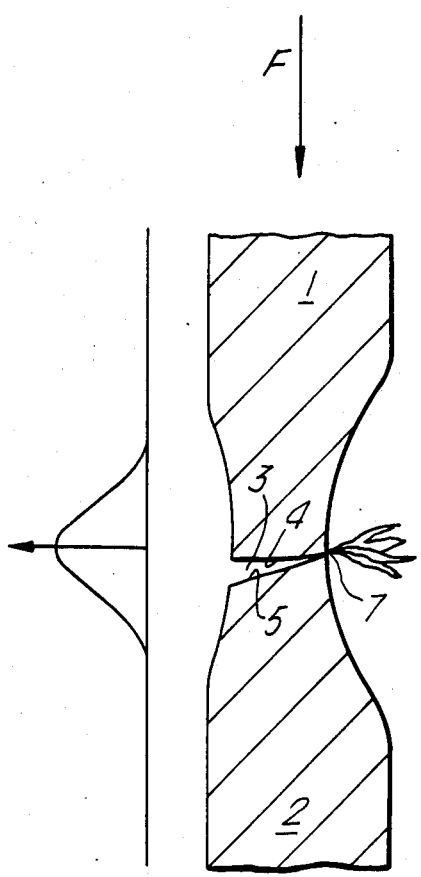
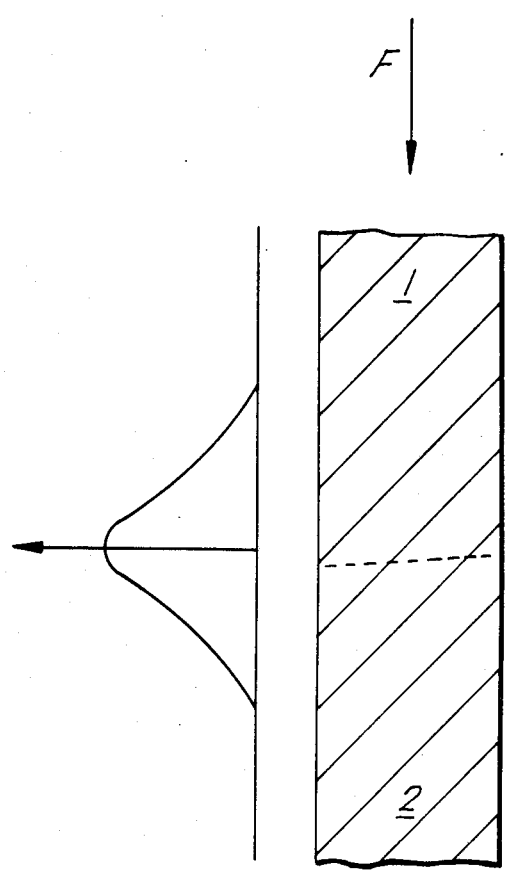

METHOD FOR JOINING TUBULAR PARTS OF METAL BY FORGE/DIFFUSION WELDING

The present invention relates to a method for joining tubular parts of metal by forge/diffusion welding, comprising the following steps:

establishing a joint between opposed bounding surfaces on the respective parts to be joined, which joint having the form of a cavity with varying height, heating the parts to a predetermined temperature at least in those areas bordering on the joint, the cavity of the joint during the heating being supplied with an inert or reducing flushing gas, joining the parts by pressing them together, and cooling the parts.

Such a method is described in the Applicant's International Publication No. NO. 83/03565, published on 27th October 1983. In this method the joint is initially given the form of a cavity having increasing height from the periphery towards the middle, i.e. in case of tubular parts the joint would be approximately closed along the periphery both on the inside and the outside of the parts. The joint is provided with at least one connecting conduit for the supply of inert or reducing flushing gas.

The object of the present invention is to simplify and improve the above method, e.g. as regards the flushing and the initial form of the cavity.

This is obtained according to the invention by a method of the above type, which is characterized in that the joint during the heating and flushing is held sufficiently open to permit flushing transversally through the joint, the gas being supplied from the outside of the joint.

This simplifies the supply of flushing gas and also ensures quick and efficient flushing of the joint.

According to a further feature of the invention, the joint is initially given increasing height from one side of the tubular parts to the other. This will simplify the preceding machining of the ends of the tubular parts, for instance by giving them the form of truncated cones having different apex angles. Such shaping of the ends of the tubular parts permits the use of the method with less restrictive requirements to the roundness of the tubular parts.

In accordance with an advantageous embodiment of the invention, the cavity of the joint may be closed on one side by means of a sealing device comprising means for supply of the flushing gas.

The method according to the invention can also be adapted for welding under water. In this case it will be advantageous to cover the joint area on the opposite side of the sealing device by means of a collar or the like, which is filled with flushing gas through the joint in order to prevent direct contact with the surrounding medium. Before commencing the heating, the space between the sealing device and the joint area may be emptied for surrounding medium by displacing it by means of flushing gas.

According to a further advatageous feature of the invention, during the pressing together of the parts the joint is brought to close successively in the direction towards the supply direction of the flushing gas. Thereby the flushing gas will be forced out of the joint during the joining, so that it will not be necessary to evacuate the joint in advance.

It has surprisingly been found that the joining of the parts can take place very quickly, 1-2 sec. without post-heating, if one as reducing gas is using hydrogen with less than about 100 ppm of $H_2O/O_2$ for usual structural steels, e.g. steels containing about 0,2 percent C, 0,7 percent Mn and 0,3 percent Si. For high strength steels alloyed with e.g. 0,2 percent C, 1,6 percent Mn, 0,55 percent Si and residues of Ti or Al, the joining can also take place very quickly if the hydrogen has less than about 15 ppm of $H_2O/O_2$. In order to ensure complete oxide removal from the joint for alloyed steels, it is suggested according to the invention that the flushing with hydrogen is maintained until the contents of $H_2O/O_2$ in the flushing gas leaving the joint is less than about 15 ppm.

For the better understanding of the invention it will be described more closely with reference to the examplifying embodiments shown in the appended drawings, in which:

FIG. 2 shows at a larger scale a fraction of FIG. 1 immediately before welding;

FIG. 3 shows the parts in FIG. 2 after completed joining.

Figure 1:
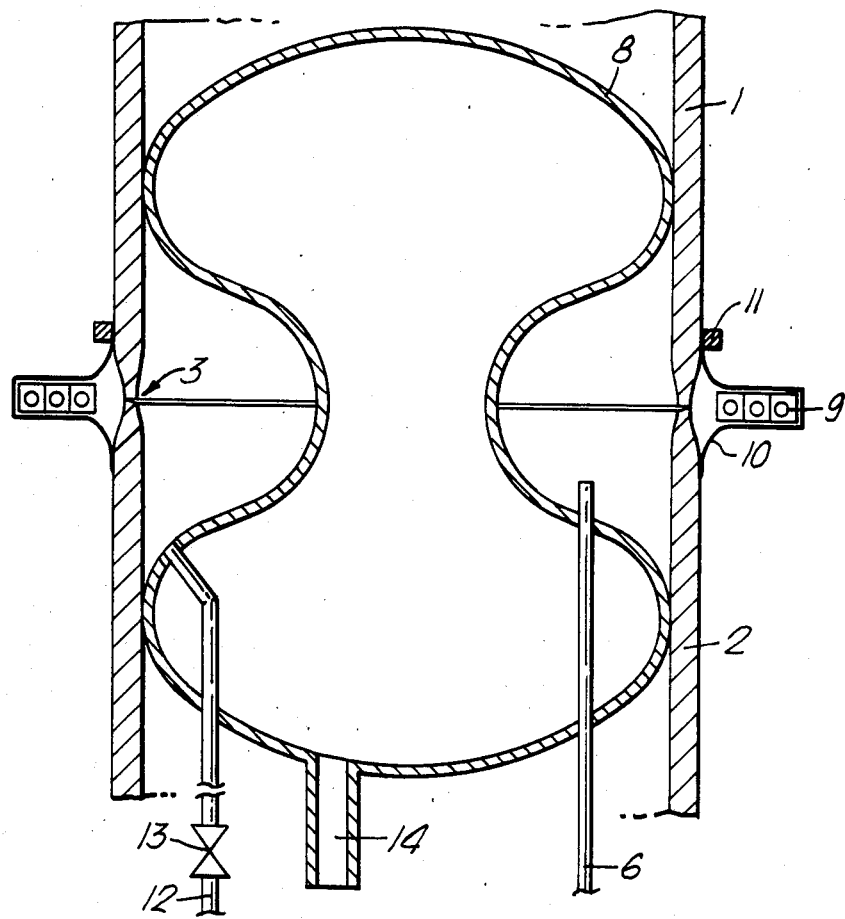
FIG. 1 shows a section through two juxtaposed tubular parts before welding.

The two parts 1, 2 are constituted by relatively thin-walled pipes which are to be welded together at a joint 3. In the joint area the tubular parts are internally provided with a sealing device 8 in the form of an inflatable packer so that the area around the joint 3 can be isolated on the inside of the tubular parts. Flushing gas is supplied through a conduit 6 in the packer.

The embodiment shown in FIG. 1 concerns welding of two pipes under water. The pipes are arranged vertically with the packer 8 on the inside, while an induction coil 9 is arranged around the joint 3 on the outside of the pipes for heating the joint area. In order to prevent water from coming into direct contact with the joint area during the welding, the joint area, on the opposite side of the packer 8, is covered by a collar 10, which advantageously may consist of heat resistant material, for instance asbestos-containing material. At the top the collar 10 is pressed sealingly against the pipe 1 by means of a sealing ring 11.

From FIG. 1 it may also be seen that the sealing device 8 is provided with a conduit 12 which leads to the surroundings from the space defined between the sealing device and the pipes. This conduit may be opened and closed by means of a valve 13. Furthermore, the sealing device 8 is provided with a supply conduit 14 for inflating medium, which may be any suitable fluid, for instance water.

When carrying out this example of the method according to the invention, the various parts are first brought in position as shown in FIG. 1, and the sealing device 8 is subjected to a suitable pressure. Thereafter, flushing gas is supplied through the conduit 6 while the valve 13 concurrently is held in the open position, so that any water in the space between the sealing device and the tubular parts is displaced out through the conduit 12. When almost all the water has been displaced, the valve 13 is closed, and flushing gas will now flow out through the joint 3 and displace any water between the collar 10 and the joint area.

As flushing gas an inert gas may be used, but in many instances it will be possible to use a reducing gas, for instance hydrogen, already from the start. For many types of steel it is not necessary to evacuate the joint area for hydrogen after the heating and welding process have begun, particularly if the joint is given such a form that it will close successively in the direction towards the supply direction of the flushing gas when the joint is pressed together.

Such an advantageous joint form is schematically suggested in FIG. 2, this figure corresponding to a portion at a larger scale of the joint area to the right in FIG. 1, however with the difference that the welding takes place in air, as it is suggested with the burning hydrogen flowing out of the joint on the outside of the tubular parts. Here the joint 3 has the form of a wedge. The arrows F indicate a variable force for pressing the parts together, while the bellshaped curve to the left of the parts 1 and 2 indicates the axial temperature distribution in these parts.

Following sufficient flushing of the joint 3 and heating of the parts 1, 2, the parts are pressed together as suggested by the arrows F. The joint 3 will first close at 7, and by further pressing together the limit line for the contact between the surfaces 4 and 5 will move successively towards the left so that no pockets will form in the joint. The gas in the joint is therefore pressed out even if the gas should be at a relatively high pressure.

It will be seen that the parts 1, 2 are given reduced cross-section in the joint area. This is done in order to more easily obtain a tri-axial stress condition in the joint area when the material, during the pressing together of the parts, flows so that these obtain the form shown in FIG. 3.

From FIG. 2 it may be seen that the narrowest portions of the parts 1, 2 lie somewhat eccentrically with respect to the middle line of the pipe walls. This eccentricity is adapted to the form of the joint and the way it will make the material flow during the pressing together, so that the end result will be generally symmetrical about the middle line, as shown in FIG. 3.

It will be understood that many different types of sealing devices 8 may be used. If the pipes are so thin-walled in relation to their diameter that the joint surfaces 4, 5 will give insufficient alignment and guidance between the tubular parts during the joining, the sealing device 8 may be formed to give the necessary axial guidance.

For flushing the joint 3 a number of different gases may be used, particularly reducing gases. However, hydrogen has so far proved to be the most suitable for the steel types usually used in offshore pipelines. Furthermore, one has found that if one uses sufficiently pure hydrogen and a material temperature of 1000° C. to 1250° C., depending upon the steel quality, one may obtain almost immediate reduction of all surface oxides. Since the joint surfaces thus become entirely clean, the pressing together of the parts may take place very quickly, i.e. like in forge welding. In using the method according to the invention for welding common commercial steels, the hydrogen should contain less than 100 ppm $H_2O/O_2$. For high strength steels alloyed with Mn and Si and containing residues of Ti or Al, the contents of $H_2O/O_2$ should be less than 15 ppm. A check on whether the joint has become sufficiently clean before the pressing together may be obtained by measuring the contents of $H_2O/O_2$ in the hydrogen flowing out of the joint during the flushing. The flushing should be continued until the contents of the impurities have sunk to for instance 15 ppm.

Even though FIG. 1 shows the use of an induction coil 9 for heating the parts, it will be clear to the skilled person that a number of other heating methods may be used, for instance high frequency resistance heating, which is advantageous at wall thicknesses greater than about 12 mm.

What is claimed is:

1. An improved method for joining one tubular metal part to another tubular metal part by forge/diffusion welding, said metal parts being elongated and having a generally constant first cross section, comprising the steps:
   establishing a joint between opposed bounding surfaces on said one and said other parts, said opposed surfaces defining a cavity therebetween before welding, the peripheries of said opposed bounding surfaces being in close proximity to each other at an outer side of said parts and further apart at the other, inner side of said parts, said parts each having a reduced cross section in the area of said joint, before welding;
   heating said one and said other parts to a predetermined temperature at least in areas bordering said joint;
   supplying a reducing flushing gas to said cavity during said heating, said flushing gas being introduced into the cavity at said other, inner side of said parts and flowing transversely through said cavity;
   welding said parts to each other by pressing said parts together, with a predetermined speed, until said areas having initially reduced cross sections have a second cross section, after welding, substantially equal to said generally constant first cross section of said elongated parts; and
   cooling the parts.

2. The method according to claim 1, wherein the joint cavity initially has gradually increasig height from the outer side of the tubular parts to the inner.

3. The method according to claim 1, wherein the cavity of the joint is closed on one side by means of a sealing device including means for supplying the flushing gas.

4. The method according to claim 3, wherein the joint area, on the opposite side of the cavity from the sealing device, is covered by a collar or the like , the collar filled with flushing gas through the joint in order to prevent direct contact with the surrounding medium.

5. The method according to claim 3, wherein before the heating step, the surrounding medium is emptied from the space between the sealing device (8) and the joint area by displacing the medium by means of flushing gas.

6. The method according to claim 1, wherein during the pressing together of the metal parts, the joint closes in the direction towards the supply direction for the flushing gas.

7. The method according to claim 6, wherein hydrogen having less than 100 ppm $H_2O/O_2$ is used as reducing gas.

8. The method according to claim 7, wherein hydrogen having less than 15 ppm $H_2O/O_2$ is used as reducing gas.

9. The method according to claim 8, wherein flushing with hydrogen is maintained until the contents of $H_2O/O_2$ in the flushing gas flowing out of the joint (3) is less than about 15 ppm.

10. The method according to claim 2, wherein the cavity of the joint is closed on one side by means of a sealing device including means for supplying the flushing gas.

11. The method according to claim 4, wherein before the heating, the surrounding medium is emptied from the space between the sealing device and the joint area by displacing the medium by means of flushing gas.

* * * * *